United States Patent
Peeler et al.

(10) Patent No.: US 9,894,439 B1
(45) Date of Patent: Feb. 13, 2018

(54) ADAPTIVE MICROPHONE SIGNAL PROCESSING FOR A FOLDABLE COMPUTING DEVICE

(71) Applicant: Dell Products L. P., Round Rock, TX (US)

(72) Inventors: Douglas J. Peeler, Austin, TX (US); Lawrence E. Knepper, Leander, TX (US); William D. Todd Nix, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/420,216

(22) Filed: Jan. 31, 2017

(51) Int. Cl.
| H04R 3/00 | (2006.01) |
| H04R 3/04 | (2006.01) |
| H04R 1/40 | (2006.01) |
| G10L 21/0216 | (2013.01) |
| G10L 21/0232 | (2013.01) |

(52) U.S. Cl.
CPC .......... *H04R 3/005* (2013.01); *G10L 21/0232* (2013.01); *H04R 1/406* (2013.01); *H04R 3/04* (2013.01); *G10L 2021/02166* (2013.01); *H04R 2499/11* (2013.01)

(58) Field of Classification Search
CPC ...... H04R 3/005; H04R 2499/11; H04R 3/04; G10L 21/0232; G10L 2021/02166
See application file for complete search history.

(56) References Cited

U.S. PATENT DOCUMENTS

| 6,535,610 B1 * | 3/2003 | Stewart | G06F 1/1605 381/92 |
| 2006/0245583 A1 * | 11/2006 | Mizushima | H04M 9/082 379/406.01 |
| 2013/0329908 A1 * | 12/2013 | Lindahl | G10L 21/0208 381/92 |
| 2015/0185054 A1 * | 7/2015 | Hesch | G01D 9/005 702/187 |
| 2016/0295323 A1 * | 10/2016 | Yliaho | H04R 3/005 |

OTHER PUBLICATIONS

MathIsFun website, "The Law of Cosines", Copyright 2012.*

* cited by examiner

*Primary Examiner* — Sonia Gay
(74) *Attorney, Agent, or Firm* — Campbell Stephenson LLP; Shiv S. Naimpally

(57) ABSTRACT

A computing device includes a first housing and a second housing attached by a hinge. The first housing includes a first microphone and the second housing includes a second microphone. After determining that an angle between the first and second housing has changed to a current angle, the computing device may determine a distance between the first microphone and the second microphone based on the current angle. A first audio signal from the first microphone and a second audio signal from the second microphone may each be modified (e.g., using a beamforming algorithm) to create first and second modified audio signals. The first and second modified audio signals may include less noise than the first and second audio signals. The first and second modified audio signals may be sent to an output jack or to an audio application.

20 Claims, 10 Drawing Sheets

BOOK ORIENTATION 502

502(1)

502(2)

VERTICAL TABLET ORIENTATION 504

504(1)

504(2)

ADAPTIVE MICROPHONE SIGNAL PROCESSING FOR A FOLDABLE COMPUTING DEVICE

BACKGROUND OF THE INVENTION

Field of the Invention

This invention relates generally to foldable computing devices and, more particularly, to adaptive microphone tuning for a foldable computing device with a first microphone on a first housing and a second microphone on a second housing that is coupled to the first housing by one or more hinges.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a tablet computing device that has at least two display devices, e.g., at least a dual-display computing device, the various components of the computing device may be located in (1) a first housing that includes a first display device and (2) a second housing that includes a second display device. One or more hinges may attach the first housing to the second housing. The first housing may include a first microphone and the second housing may include a second microphone. In such a computing device, adjusting one housing relative to the other housing may change an angle between the two microphones. Extracting a high-quality audio signal using the two microphones may be difficult because a change in the angle between the two microphones may change the characteristics (e.g., volume, phase, and the like) of the audio signals received by each microphone.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

A computing device includes a first housing and a second housing attached by a hinge. The first housing includes a first microphone and the second housing includes a second microphone. After determining that an angle between the first and second housing has changed from a previous angle to a current angle, the computing device may determine a distance between the first microphone and the second microphone based on the current angle. First and second audio signals received from the first and second microphones, respectively, may be modified to create first and second modified audio signals that include less noise than the first and second audio signals.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
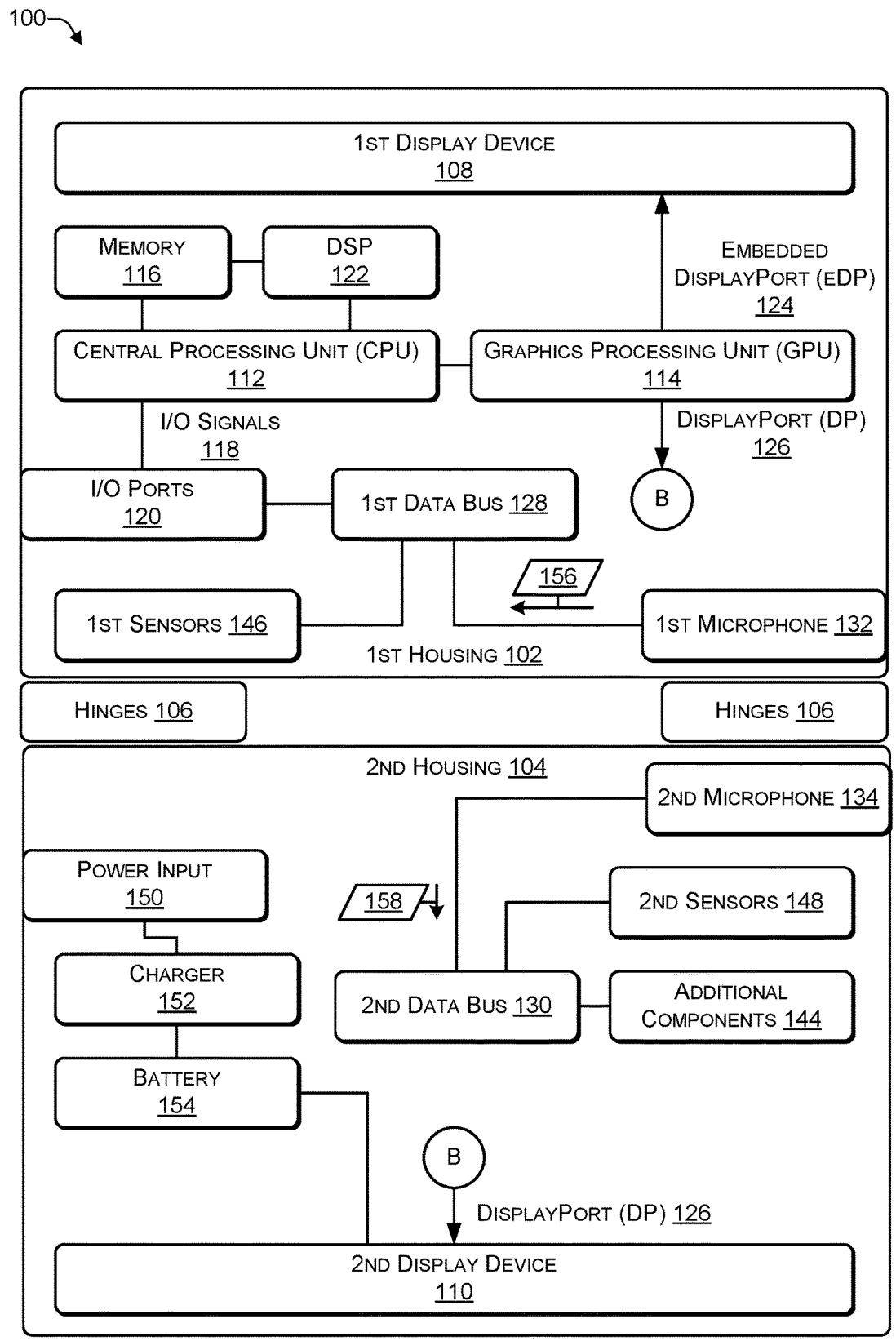
FIG. 1 is a block diagram of an architecture of a computing device that includes two housings according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may determine that an angle has changed between two housings of a computing device and determine a distance a between two microphones, where each of the microphones is mounted on one of the housings. The distance may be used in an audio processing algorithm to improve a quality of the audio received from the microphones. The improved audio may be sent to an application, such as a video conferencing application (e.g., Skype®), an audio telephony application, an audio conferencing application, a speech recognition (e.g., speech-to-text) application, or other type of application. For example, the microphones and audio processing algorithm may be used to perform beamforming on the audio signals received from the microphones to improve the audio quality of speech in a noisy environment.

Multiple microphones many be used to perform beamforming (e.g., spatial filtering) to extract particular signals (e.g., speech signals) in an environment (e.g., a noisy environment) that may include other sounds that interfere with the particular signals. In beamforming, multiple transducers (e.g., microphones) receive multiple audio signals, with each audio signal having a different volume level and a different phase. The distance between the microphones may be used in an audio processing algorithm to perform constructive interference between the two audio signals. For example, the audio processing algorithm may change a volume of one or both of the audio signals, introduce a delay in one or both of the audio signals, or any combination thereof. The delay may be relatively small, e.g., several hundred milliseconds (ms) or less. The delay may cause a change in the phase of the audio signal(s) relative to each other. The difference in phase between the two audio signals may result in phase cancellation of the noise present in the audio signals. Phase cancellation occurs when two signals of the same frequency are out of phase with each other, resulting in a reduction in the volume of the combined signal. For example, if two identical signals are 180 degrees out of phase, the two signals will cancel one other when combined. Beamforming can thus be used to select particular sounds (e.g., voice) that are desirable, while attenuating the remaining (e.g., unwanted) sounds.

For example, multiple filters may be used to filter each audio signal received from the microphones into multiple frequency bands, with at least one frequency band encompassing the frequencies in which speech occurs, and at least two additional frequency bands, one above the speech band and one below the speech band. The phase and volume of the two additional frequency bands of one or both audio signals may be modified to introduce phase cancellation that attenuates the non-speech frequencies, thereby improving voice quality in the audio signal.

In some cases, the audio algorithm may initially use multiple frequency bands in the speech band to identify the frequencies associated with the primary user's speech and then create a single speech band. For example, a male voice typically occupies the frequencies 85 to 180 Hertz (Hz,) while a female voice typically occupies the frequencies 165 to 255 Hz. The audio algorithm may use at least 4 bands, e.g., (1) below 85 Hz, (2) 85 Hz-170 Hz, (3) 171 Hz-255 Hz, and (4) above 255 Hz. The audio algorithm may analyze a first portion (e.g., less than a few seconds) of the audio signals and determine which frequencies the primary speaker's speech occupies. Based on this information, the audio algorithm may subsequently divide the audio signals into three bands. For example, if the analysis of the audio signals indicates that the user of the computing device is speaking between approximately 85 Hz-180 Hz, the audio algorithm may create three bands, e.g., (1) below 85 Hz, (2) between 85 Hz-180 Hz, and (3) above 180 Hz. The audio algorithm may modify a volume and phase of bands (1) and (3) to attenuate unwanted signals, thereby improving the intelligibility of the voice band (e.g., between 85 Hz-180 Hz).

Thus, a computing device may have two sides connected by a hinge. A first microphone A may be mounted on a first side (e.g., first housing) and a second microphone B may be mounted on a second side (e.g., second housing). The offset distance of A and B from the hinge may be previously determined and stored in a memory of the computing device (e.g., when the computing device is initially manufactured). Sensors (e.g., a rheostat in a hinge or the like) may be used to determine an initial angle between the first side and the second side. Based on the initial angle, an initial distance between a first microphone in the first housing and a second microphone in the second housing may be determined (e.g., using the law of cosines). For example, when a user powers on the computing device, logs in to the computing device, or starts an audio application, the computing device may determine an initial angle between a first housing and a second housing of a computing device. Based on the initial angle, a distance between a first microphone in the first housing and a second microphone in the second housing may be determined (e.g., using the law of cosines). One or more sensors may be used to detect when an angle between the two sides of the computing device has changed, e.g., due to the user changing an orientation of the computing device that results in one or both sides being moved. The one or more sensors may be used to determine an angle $\gamma$ between the two sides. The angle $\gamma$ between the two sides may be used to determine a distance C between the two microphones, e.g., using the law of cosines. For example:

$$c = \sqrt{a^2 + b^2 - 2ab\cos\gamma}.$$

The distance C between the two microphones may be used, along with the audio signal from each microphone, as inputs into an audio algorithm. The audio algorithm may use a beamforming algorithm or other digital signal processing (DSP) algorithms to modify the two audio signals to reduce unwanted noise in the audio signals. The type of noise that is reduced may depend on the audio application being used. For example, for audio applications that require intelligibility of human speech, the audio signals may be modified to reduce non-speech content to improve the intelligibility of speech. As another example, when recording a particular instrument for a digital audio mixer application, frequency bands outside a particular frequency band may be considered noise. To illustrate, the frequency range of acoustic guitar typically ranges between 80 Hz and 1400 Hz. The frequency bands in each audio signal that include frequencies below 80 Hz and frequencies above 1400 Hz may be modified (e.g., by modifying a phase of the frequency bands) to reduce their volume. In some cases, the user may specify which frequency bands are considered noise, which frequency band is desired to be enhanced (e.g., by reducing noise outside the frequency band), or any combination thereof. The user may specify one or more frequency bands to be considered as noise by specifying a frequency range or by recording a sample of the sound source. For example, the sound of a noisy fan of a heating, ventilation, and cooling (HVAC) system may be sampled. The audio algorithm may perform a spectral analysis on the audio sample to identify the dominant frequencies and modify the volume and/or phase of the frequency bands in the audio signals received from the microphones to reduce the noise. The user may specify the frequency bands to be enhanced by specifying a frequency range or by recording a sample of a voice, one or more instruments, or other sound sources. The audio algorithm may perform a spectral analysis on the audio sample to identify the dominant frequencies and determine additional frequency bands above and below the dominant frequencies. The volume and phase of the additional frequency bands may be modified to reduce noise and enhance the sounds of the sound source captured in the audio sample.

As a first example, a computing device a first housing coupled to a second housing by one or more hinges. The first housing may include a first microphone and the second housing may include a second microphone. The computing device may include one or more non-transitory computer-readable media to store instructions executable by one or more processors to perform operations. For example, the operations may include receiving sensor data from one or more sensors and determining that a first angle between the first housing and the second housing has changed to a second angle and determining, based on the second angle, a distance between the first microphone and the second microphone. The distance between the first microphone located in the first housing and the second microphone located in the second housing may be determined by retrieving a first offset distance between the first microphone and the one or more hinges, retrieving a second offset distance between the second microphone and the one or more hinges, and determining the distance based on (1) the first offset distance plus, (2) the second offset distance, and (3) the second angle. The operations may also include receiving a first audio signal from the first microphone and receiving a second audio signal from the second microphone. The operations may further include modifying (e.g., using an audio signal processing application) the first audio signal, based at least in part on the distance, to create a first modified audio signal and modifying the second audio signal, based at least in part on the distance, to create a second modified audio signal. Modifying the audio signals may include performing spatial filtering by modifying at least one of a phase (e.g., using delay) or a volume of one or both of the first and second audio signals. The first and second modified audio signals may include less noise than the first and second audio signals. The operations may include sending the first modified audio signal and the second modified audio signal to at least one of an output jack or an audio application. The operations may also include determining that the second angle between the first housing and the second housing has changed to a third angle and determining, based on the third angle, a new distance between a first microphone located in the first housing and a second microphone located in the second housing. Audio processing software may modify the first and second audio signals, based at least in part on the new distance.

As a second example, a computing device may include a first housing connected to a second housing by one or more hinges. In some cases, the computing device may receive sensor data from one or more sensors of the computing device. In other cases, the computing device may determine that at least one of the one or more sensors caused an interrupt, and retrieve sensor data from the sensor. Based at least in part on the sensor data, the computing device may determine that a first angle between the first housing and the second housing has changed to a second angle. The computing device may determine, based on the second angle, a distance between a first microphone located in the first housing and a second microphone located in the second housing. The second angle may be between about 30 degrees to about 150 degrees. The computing device may determine the distance between the first microphone and the second microphone by retrieving a first offset distance of the first microphone from the one or more hinges, retrieving a second offset distance of the second microphone from the one or more hinges, and determining a square root of ((a square of the first offset distance) plus (a square of the second offset distance) minus (double the first offset distance times double the second offset distance times a cosine of the second angle)). Audio processing software being executed by the computing device may receive a first audio signal from the first microphone and a second audio signal from the second microphone. The audio processing software may modify the first audio signal, based at least in part on the distance, to create a first modified audio signal and may modify the second audio signal, based at least in part on the distance, to create a second modified audio signal. The audio processing software may send the first modified audio signal and the second modified audio signal to an output jack or an audio application. The computing device may determine that the second angle between the first housing and the second housing has changed to a third angle and determine, based on the third angle, a new distance between a first microphone located in the first housing and a second microphone located in the second housing. The audio processing software, may modify the first audio signal and the second audio signal, based at least in part on the new distance.

As a third example, a computing device may include a first housing, having a first microphone, coupled by one or more hinges to a second housing, having a second microphone. The computing device may include one or more non-transitory computer-readable media to store instructions executable by one or more processors to perform various operations. For example, the operations may include receiving sensor data from one or more sensors of the computing device and determining that an angle between a first housing and a second housing has changed from a first angle (e.g., previous angle) to a second angle (e.g., current angle). The operations may include determining that the second angle is between about 20 degrees and about 160 degrees. The operations may also include determining, based on the second angle, a distance between the first microphone and the second microphone. For example, the distance between the first microphone and the second microphone may be determined by retrieving a first offset distance between the first microphone and the one or more hinges, retrieving a second offset distance between the second microphone and the one or more hinges, and determining the distance based on (1) the first offset distance, (2) the second offset distance and (3) the second angle. The operations may include modifying, based on the distance, a first audio signal received by the first microphone and a second audio signal received by the second microphone to create a first modified audio signal and a second modified audio signal, respectively. The first and second modified audio signals may be sent to at least one of an output jack or an audio application. The operations may include determining that the angle between the first housing and the second housing has changed from the second angle to a third angle and determining, based on the third angle, a new distance between a first microphone located in the first housing and a second microphone located in the second housing. The operations may include modifying the first audio signal and the second audio signal, based at least in part on the new distance to improve an intelligibility of speech.

FIG. 1 is a block diagram of an architecture of a computing device 100 that includes two housings according to some embodiments. The computing device 100 may include a first housing 102 coupled to a second housing 104 via one or more hinges 106. The hinges 106 may enable the two housings 102, 104 to be positioned at different angles relative to each other in different orientations (e.g., vertical orientations and horizontal orientations). Of course, additional housings may be attached via additional hinges to create a computing device with multiple housings.

A first display device 108 may be located in the first housing 102 and a second display device 110 may be located in the second housing 104. A first portion of the components of the computing device 100 may be located in the first housing 102 (e.g., behind the first display device 108) while a remaining portion of the components of the computing device 100 may be located in the second housing 104 (e.g., behind the second display device 110). For example, as illustrated in FIG. 1, the components located in the first housing 102 may include at least one central processing unit (CPU) 112, a graphics process unit (GPU) 114, and a memory (e.g., computer-readable media) 116. The GPU 114 may be integrated into the CPU 112 or may be a separate device from the GPU 114. The CPU 112 may communicate input/output (I/O) signals 118 via multiple I/O post 120. The I/O ports 120 may include video ports (e.g., a video graphics adapter (VGA) port, a digital video interface (DVI) port, a high definition media interface (HDMI) port, a Thunder-Bolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 100 may include at least one digital signal processing (DSP) processor 122 to perform audio (and video) signal processing. The GPU 114 may provide two or more lanes of embedded DisplayPort (eDP) output 124 that are sent to the first display device 108 in the first housing 102 and two or more lanes of DisplayPort (DP) output 126 that are sent (e.g., wirelessly or via a cable) to the second display device 110 in the second housing 104.

A first data bus 128 in the first housing 102 and a second data bus 130 in the second housing 104 may distribute data among the various components of the computing device 100. For example, the data buses 128, 130 may distribute data from the I/O signals 118, the I/O ports 120, a first microphone 132, a second microphone 134, a first set of sensors 146, a second set of sensors 148, and additional components 144. For example, the data buses 128, 130 may distribute data by receiving data from a component of the computing device 100 and transmitting the data to one or more other components of the computing device 100.

The second housing 104 may include a remaining portion of the components of the computing device 100. In some cases, the components in the second housing 104 may be located behind the second display device 110. The second housing 104 may include the second microphone 134, the additional components 144 (e.g., keyboard, touchpad, trackball, speaker, microphone, Wi-Fi antenna, Bluetooth antenna, cellular antenna, and the like), the second sent of sensors 148, a power input 150 (e.g., alternating current (AC) or direct current (DC) input), a charger 152, and a battery 154. The battery charger 152 may be used as a power source to provide power instead of (or in addition to) the battery 154 when the battery 154 is depleted or inoperable. In some cases, data cables may run through the hinges 106 to connect the components of the computing device 100 located in the first housing 102 with the components of the computing device 100 located in the second housing 104. In other cases, a first wireless transceiver in the first housing 102 and a second wireless transceiver in the second housing 104 may wirelessly connect the components of the computing device 100 located in the first housing 102 with the components of the computing device 100 located in the second housing 104. The first set of sensors 146 and the second sensors 152 may include one or more of an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

In FIG. 1, the first set of components of the computing device 100 shown as being located in the first housing 102 and the remaining set of components shown as located in the second housing 104 are purely for illustration purposes. Depending on the implementation, different components of the computing device 100 may be housed in each of the housings 102, 104. For example, when the computing device 100 is designed for graphics processing, the GPU 114 and supporting hardware (e.g., graphics support chips, graphics memory, and the like) may be housed in the second housing 104. As another example, in some cases, the ports 120 may be located in the first housing 102, in the second housing 104, or split between the two housings 102, 104. As a further example, the battery 154 may include multiple power cells, with a portion of the power cells located in the first housing 102 and zero or more of the power cells located in the second housing 104. In some cases, which components of the computing device 100 are located in each of the housings 102, 104 may be determined by the thermal characteristics of the components. For example, the components may be distributed between the housings 102, 104 to enable each of the housings 102, 104 to heat to approximately the same temperature. Doing so may avoid grouping components that generate the most heat into the same housing, thereby causing one housing to be hotter than the other housing.

Software instructions implementing one or more audio algorithms may be stored in the memory 116. The software instructions may be executed by the CPU 112, by the DSP processor 122, or any combination thereof. A first offset distance A of the first microphone 132 (mounted on the first housing 102) to the hinges 106 and second offset distance B of the second microphone 134 (mounted on the second housing 104) to the hinges 106 may be pre-determined (e.g., when the computing device is manufactured) and stored in the memory 116. One or more of the sensors 146, 148 may be used to determine an initial angle between the first housing 102 and the second housing 104. Based on the initial angle, a distance between the first microphone 132 and the second microphone 134 may be determined (e.g., using the law of cosines). One or more of the sensors 146, 148 may be used to detect when an angle between the two housings 102, 104 has changed, e.g., the angle may be determined in response to detecting a change in orientation of the computing device 100. One or more of the sensors 146, 148 may be used to determine an angle γ between the housing 102 and the housing 104. The angle γ between the two housings 102, 104 may be used to determine a distance C between the two microphones 132, 134 (e.g., using the law of cosines). For example:

$$c=\sqrt{a^2+b^2-2ab\cos\gamma}.$$

The distance C between the two microphones may be used, along with a first audio signal 156 from the first microphone 132 and a second audio signal 158 from the second microphone 134, as inputs into the audio algorithm. The audio algorithm may use a beamforming algorithm or other algorithm to tune the microphones 132, 134 by modifying the audio signals 156, 158 to reduce unwanted noise in the audio signals 156, 158. The type of noise that is reduced may depend on the type of audio application being used. For example, for audio applications that require intelligibility of human speech, the audio signals may be modified to reduce non-speech content to improve the intelligibility of speech. In some cases, the user may specify which frequency bands are considered noise, which frequency bands are to be enhanced (e.g., by reducing noise outside the frequency bands), or both. The volume and phase of the additional frequency bands may be modified to reduce noise to enhance the sounds of the sound source captured in the audio sample. For example, one or more frequency bands in one of the signals may be delayed to create phase cancellation with the same frequency bands in the other signal, thereby reducing the volume of the sounds (e.g., noise) in the one or more frequency bands. As another example, a frequency band in one of the signals may be delayed to create phase alignment with the same frequency band in the other signal, thereby increasing the volume of the sounds (e.g., speech) in the frequency band. In some cases, both techniques may be used, e.g., phase cancellation may be used to decrease the volume of sounds in particular (e.g., unwanted) frequency bands and phase alignment may be used to increase the volume of sounds in particular (e.g., speech) frequency bands.

Thus, a computing device may include a first housing coupled to a second housing by one or more hinges. The first housing may include a first microphone to provide a first audio signal and the second housing may include a second microphone to provide a second audio signal. When a user powers on the computing device, logs in to the computing device, or starts an audio application, the computing device may determine an initial angle between a first housing and a second housing of a computing device. Based on the initial angle, a distance between a first microphone in the first housing and a second microphone in the second housing may be determined (e.g., using the law of cosines). When sensors in the computing device detect a change in orientation of the computing device, the sensors may determine an angle formed by the first housing and the second housing. For example, the user may initiate an audio conferencing call in which the angle between the two housings is relatively small (e.g., less than 60 degrees). The user may switch the audio call to a video call (e.g., that includes audio) and move the two housings further apart (e.g., greater than 60 degrees) to enable the user to view the other participants in the video conference. The angle may be used to determine (e.g., using the law of cosines) a distance between the two microphones. An audio algorithm may modify (e.g., tune) the audio signals based on the distance between the microphones to reduce noise. For example, for speech applications, the audio algorithm may reduce noise (e.g., non-speech content) in the audio signals to improve speech intelligibility.

Figure 2:
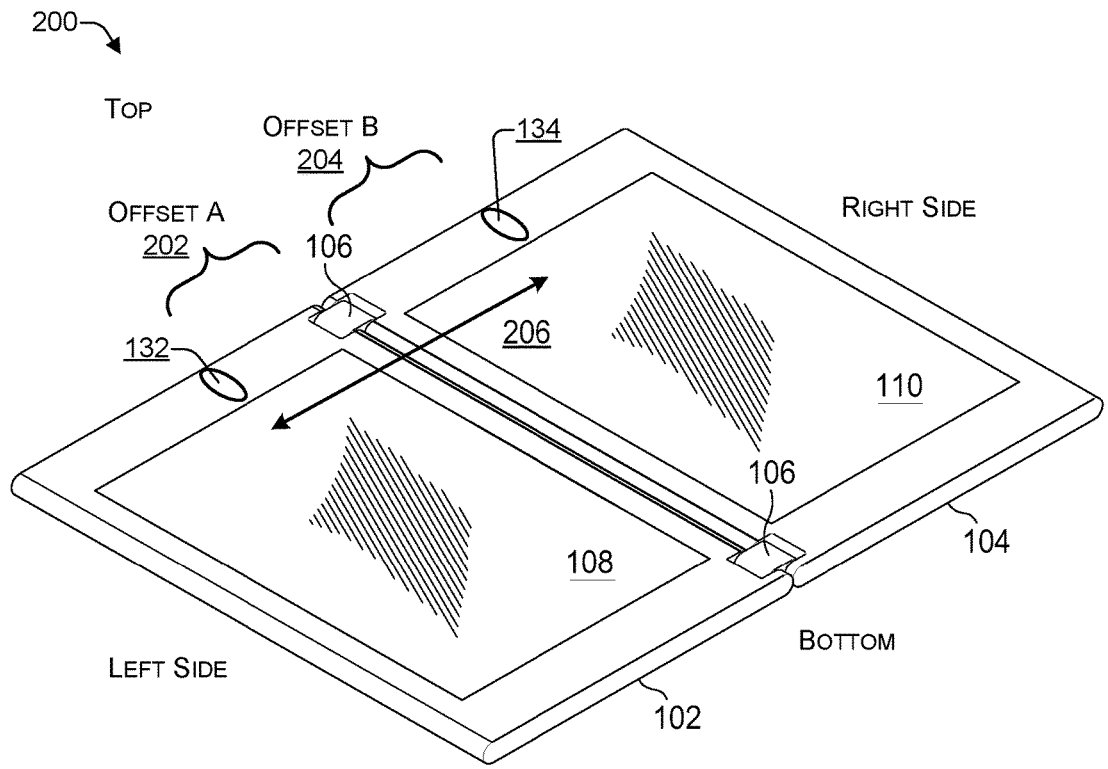
FIG. 2 is a block diagram of an architecture of a computing device that includes two microphones according to some embodiments.
Figure 2:
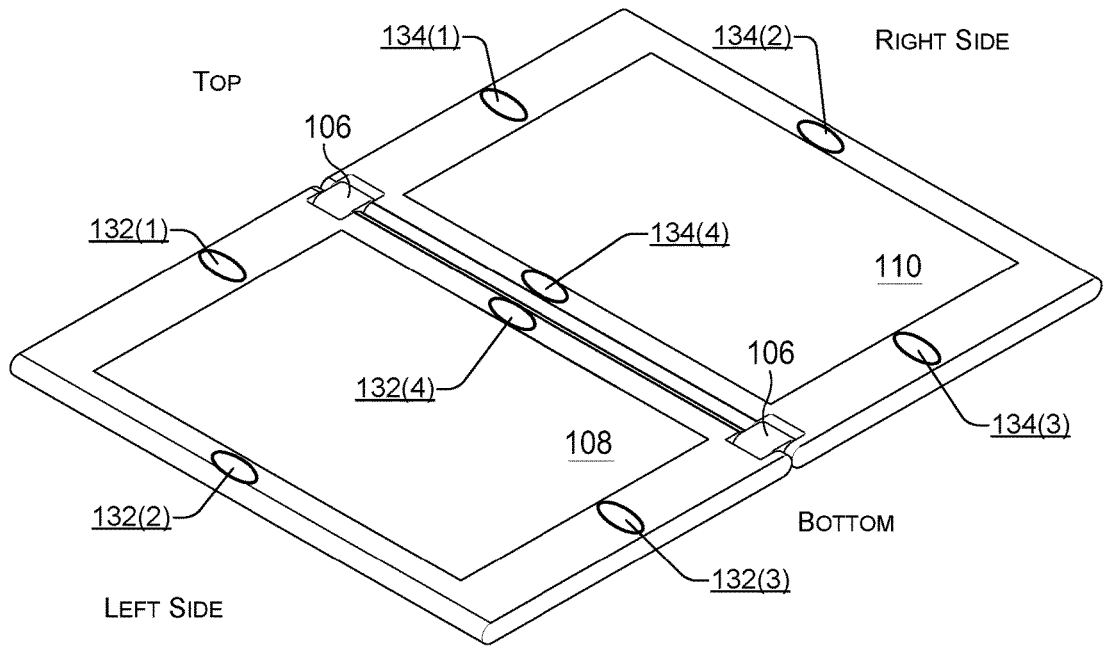

FIG. 2 is a block diagram of an architecture 200 of a computing device that includes two microphones according to some embodiments. The top half of FIG. 2 illustrates how one microphone may be placed in each of the housings 102, 104. The first microphone 132 may be located in the first housing 102 at an offset distance A 202 from a middle of a closest hinge of the hinges 106 (or from the rightmost edge of the housing 102). The second microphone 134 may be located in the second housing 104 at an offset distance B 204 from a middle of a closest hinge of the hinges 106 (or from the leftmost edge of the housing 104).

In some cases, each of the microphones 132, 134 may be located at different distances from the nearest hinge 106. For example, in some cases, the offset distance A 202 may be equal to the offset distance B 204. In other cases, the offset distance A 202 may be different (e.g., larger or smaller) than the offset distance B 204. The offsets 202, 204, along with an angle of the first housing 102 relative to the second housing 104, may be used to determine (e.g., using the law of cosines) a distance 206 between the first microphone 132 and the second microphone 134. For example, in FIG. 2, the angle of the first housing 102 relative to the second housing 104 may be approximately 180 degrees and the distance 206 between the microphones 132, 134 may be approximately the distance A 202 plus the distance B 204.

Furthermore, each of the microphones 132, 134 may be placed at different locations in the housings 102, 104, respectively. For example, the microphone 132 may be placed at a top of the housing 102, at a bottom of the housing 102, or at either the left or the right side of the housing 102. The microphone 134 may be placed at a top of the housing 104, at a bottom of the housing 104, or at either the left or the right side of the housing 104. In some cases, the placement of the microphones 132, 134 in the housings 102, 104 may be asymmetrical. For example, the microphone 132 may be placed at a top of the housing 102 while the microphone 134 may be placed at a bottom of the housing 104.

The distance 206 may be measured in a number of different ways. For example, the distance 206 may be from a mid-point of each of the microphones 132, 134, from an edge of each of the microphones 132, 134, or other measurement technique.

In addition, in some cases, as illustrated in the bottom of FIG. 2, more than 2 microphones may be located in each the housings 102, 104. For example, two or more microphones (132(1), 132(2), 132(3), or 132(4)) may be located in the top, bottom, or sides of the housing 102 and at least two microphones (134(1), 134(2), 134(3), or 134(4)) may be located in the housing 104 (e.g., located in two of the top, bottom, the left side, or the right side). The computing device 100 may monitor audio signals received from the multiple microphones and select one microphone in each of the housings 102, 104 with a particular characteristic, such as the loudest speech signal, the most speech content (e.g., the most content or highest volume in the speech frequency band).

Figure 3:
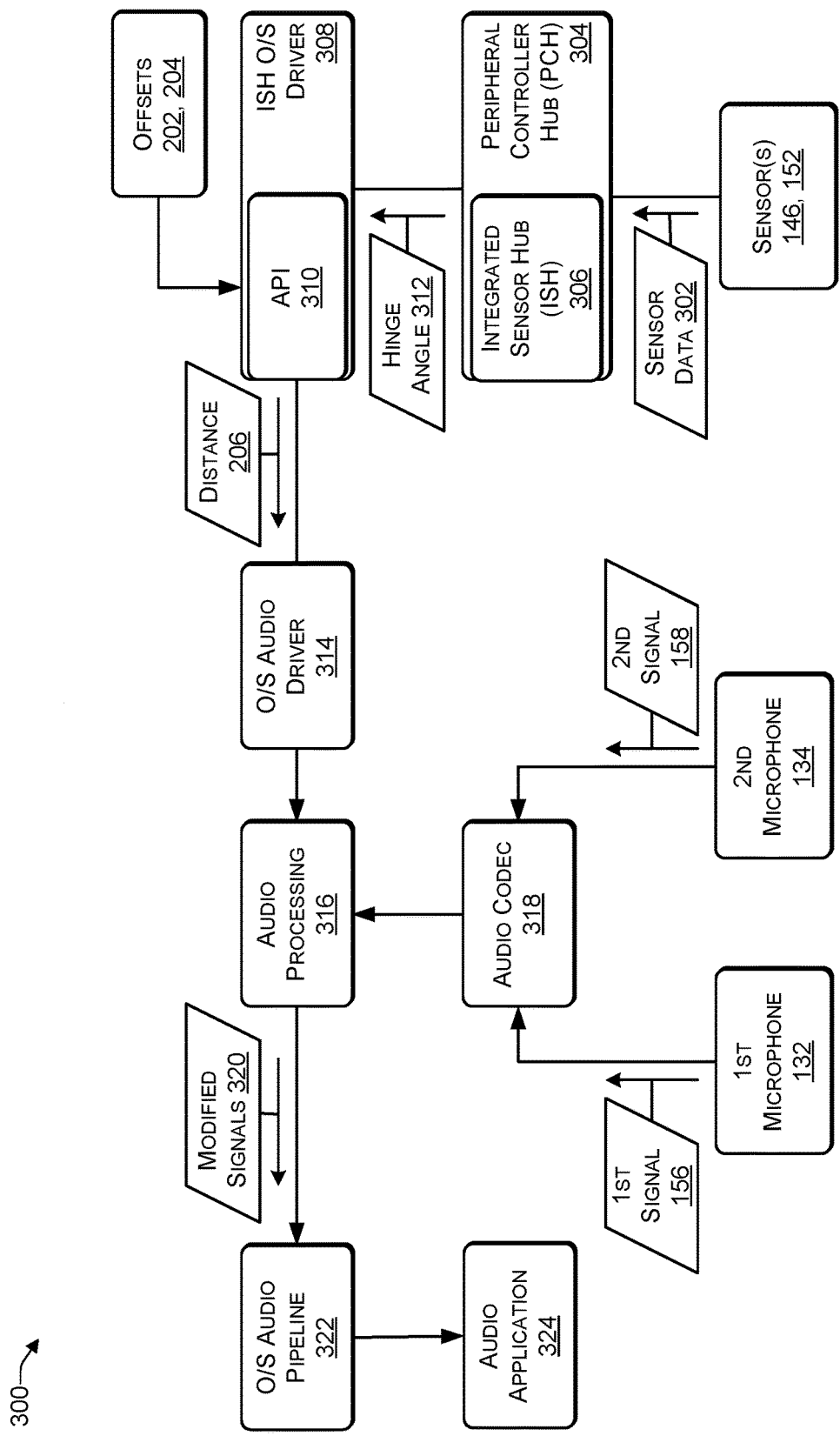
FIG. 3 is a block diagram of an audio architecture that includes an audio processing application according to some embodiments.

FIG. 3 is a block diagram of an audio architecture 300 that includes an audio processing application according to some embodiments. For example, the audio architecture 300 may be stored in the memory 116 and executed by one or more of the CPU 112 or the DSP 122 of FIG. 1.

One or more of the sensors 146, 148 may generate sensor data 302. The sensor data 302 may be sent to a component of peripheral controller hub (PCH) 304, such as an integrated sensor hub (ISH) 306. The ISH 306 may provide, to an application programming interface (API) 310 of an ISH operating system (O/S) driver 308, a hinge angle 312 that is derived from (e.g., determined based on) the sensor data 302. The hinge angle 312 may be determined from the sensor data 302 using various different techniques. For example, a rheostat may be placed in the hinges 106 such that the resistance of the rheostat varies based on the hinge angle 312. A sensor may determine a resistance of the rheostat and use the resistance to determine the hinge angle 312 between the housings 102, 104. As another example, an optical sensor may monitor a wheel placed in the hinges 106. The circumference of the wheel may include dots and the optical sensor may count how many dots have travelled past the optical sensor and in which direction to determine the hinge angle 312 between the housings 102, 104. As yet another example, a laser may be used to measure the distance between a particular location in the first housing 102 and a particular location in the second housing 104 and the hinge angle 312 may be determined based on the distance. Of course, other techniques may be used to determine the hinge angle 312 based on the sensor data 302.

The API 310 may use the offsets A 202, B 204 along with the hinge angle γ 312 to determine the distance C 206 between the microphones 132, 134. For example:

$$c = \sqrt{a^2 + b^2 - 2ab\cos\gamma}.$$

The API 310 may provide the distance C 206 to an O/S audio driver 314. An audio processing algorithm 316 may receive the distance 206 from the O/S audio driver 314 and may receive the audio signals 156, 158 (e.g., captured by the microphones 132, 134) from an audio coder/decoder ("codec") 318. The audio signals 156, 158 may be analog signals that the audio codec 318 converts into digital signals (e.g., by sampling the analog signals 156, 158 at a particular sampling rate, such as 48 kilohertz (kHz), 44.1 kHz, 22 kHz, or the like). The audio processing algorithm 316 may perform beamforming (or other digital signal processing) to reduce noise in the signals 156, 158 to create the modified signals 320 that are placed in an O/S audio pipeline 322 (e.g., for delivery to an internal speaker, an external speaker, headphone jack, or the like). In some cases, the modified signals 120 may be sent from the O/S audio pipeline 322 to an audio application 324, e.g., an audio conferencing application, a speech-to-text application, a telephony application, a video conferencing application, or other type of application.

The sensor data 302 used to determine the hinge angle 312 initially (e.g., when the user begins using an audio application) or when a change in hinge angle (e.g., a change in orientation of the computing device 100) is detected. For example, the O/S of the computing device 100 may periodically sample one or more of the sensors 146, 152 to determine whether a change in the hinge angle 312 has occurred. As another example, one or more of the sensors 146, 152 may generate an interrupt when a change in orientation is detected and, in response to the interrupt, the O/S may determine whether the hinge angle 312 has changed. If the change in the hinge angle 312 (e.g., a difference between the old hinge angle and the new hinge angle) is less than a threshold amount (e.g., a fixed amount, such as 2 millimeters, or a percentage, such as 2%) than the change may not cause the distance 206 to recalculated. However, if the change in the hinge angle 312 satisfies (e.g., is greater than or equal to) the threshold amount, then determining that the hinge angle 312 has changed may cause the distance 206 to be recalculated using the new hinge angle 312.

Thus, a computing device may have a first housing connected to a second housing by a hinge. The first housing may include a first microphone and the second housing may include a second microphone. The O/S of the computing device may (1) periodically (e.g., every N milliseconds, N>100) determine a current hinge angle (e.g., the angle between the two housings) and/or (2) receive an interrupt from one of the sensors indicating that the hinge angle has changed. The O/S may determine an initial hinge angle or whether the current hinge angle differs from a previous hinge angle by more than a threshold amount. If the hinge angle has changed by at least the threshold amount, the O/S may re-determine the distance between the two microphones and provide the re-calculated distance to the audio algorithm. The audio algorithm may use the most recently calculated distance between the two microphones to perform various signal processing, such as beamforming, to reduce noise, improve speech intelligibility for speech applications (e.g., teleconferencing, speech-to-text, and the like), or perform other types of speech processing.

Figure 4:
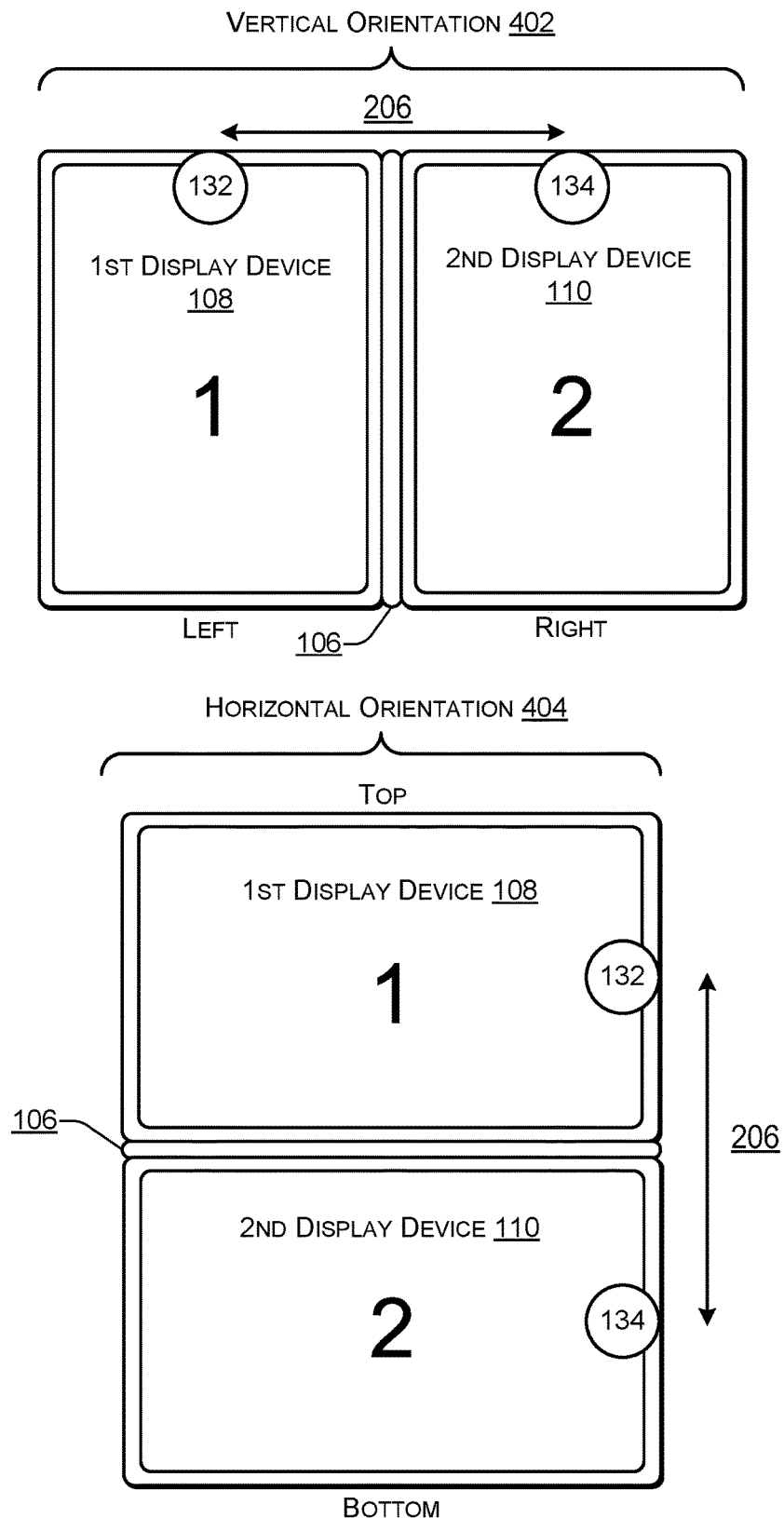
FIG. 4 is a block diagram illustrating different orientations of a dual-display device according to some embodiments.

FIG. 4 is a block diagram 400 illustrating different orientations of a dual-display device (e.g., the computing device 100 of FIG. 1) according to some embodiments. The computing device 100 may include at least two display devices, the first display device 108 and the second display device 110.

The computing device 100 may be placed in a vertical (e.g., portrait) orientation 202 or a horizontal (e.g., landscape) orientation 204. For example, in the vertical orientation 402, the first display device 108 may be on one side (e.g., the left side or the right side), the second display device 110 may be on another side (e.g., the right side or the left side), and the hinges 106 may join the first display device 108 to the second display device 110. In the horizontal orientation 404, the first display device 108 may be located at the top (or the bottom) of the computing device 100, with the hinges 106 in the middle, and the second display device 110 at the bottom (or the top) of the computing device. In both orientations 402, 404, the angle between the housings 102, 104 may be approximately 180 degrees and the distance 206 may equal the sum of the offsets 202, 204.

Figure 5:
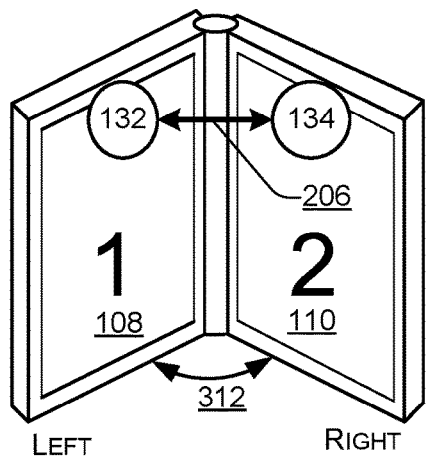
FIG. 5 is a block diagram illustrating vertical orientations of a dual-display device according to some embodiments.
Figure 5:
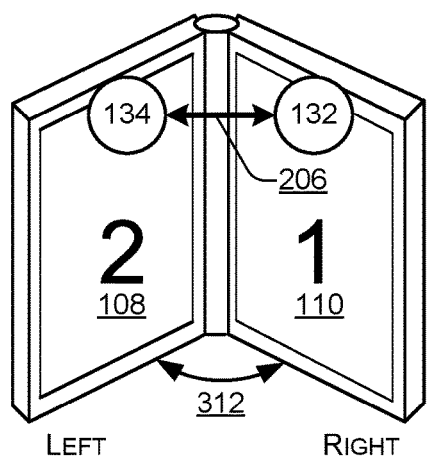
Figure 5:
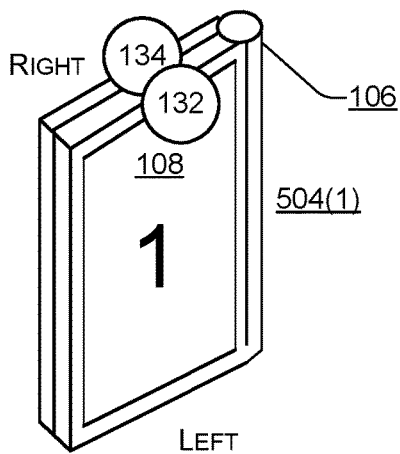
Figure 5:
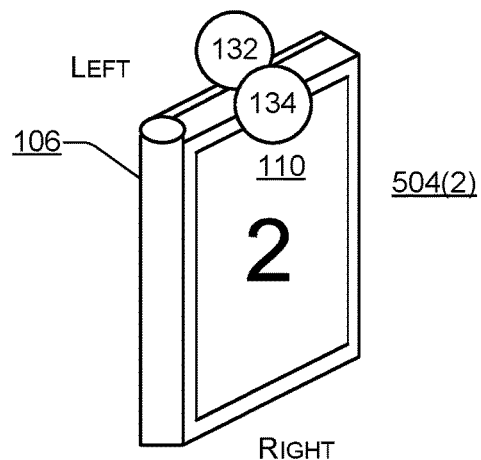

FIG. 5 is a block diagram 500 illustrating vertical orientations of a dual-screen device (e.g., the computing device 100 of FIG. 1) according to some embodiments. Examples of the vertical orientation 402 may include a book orientation 502 or a vertical tablet orientation 504. For example, in a first book orientation 502(1), the first display device 108 may be on the left and the second display device 110 may be on the right. Alternately, in a second book orientation 502(2), the second display device 110 may be on the left and the first display device 108 may be on the right. In the book orientation 502, the hinge angle 312 between the housings 102, 104 may be approximately between 0 and 180 degrees (e.g., 150 degrees, 120 degrees, 90 degrees, 60 degrees, 30 degrees, or the like).

In the vertical tablet orientation 504, the first display device 108 may be on the left and the second display device 110 may be on the right. In a first vertical tablet orientation 504(1), the first display device 108 may be facing a user and the second display device 110 may be rotated approximately 360 degrees to face away from the user. In a second vertical tablet orientation 504(2), the second display device 110 may be facing the user while the first display device 108 may be rotated approximately 360 degrees to face away from the user. In the vertical tablet orientation 504, the angle between the housings 102, 104 may be approximately 360 degrees and the distance between the two microphones may be approximately zero.

Figure 6:
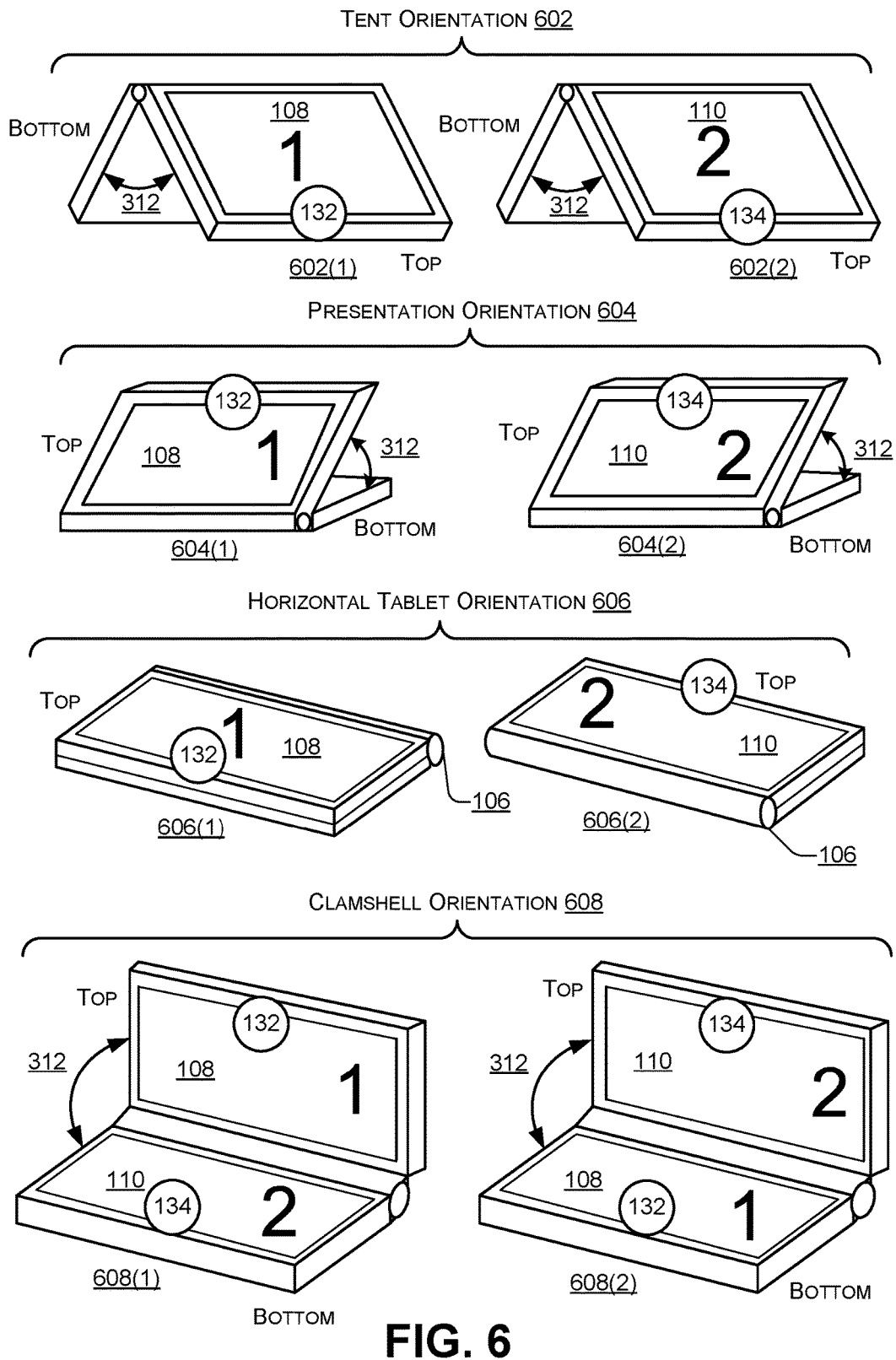
FIG. 6 is a block diagram illustrating horizontal orientations of a dual-display device according to some embodiments.

FIG. 6 illustrates horizontal orientations of a dual-screen device (e.g., the computing device 100 of FIG. 1) according to some embodiments. Examples of the horizontal orientation 404 may include a tent orientation 602, a presentation orientation 604, a horizontal tablet orientation 606, and a clamshell orientation 608.

In 602(1), the first display device 108 may be at the top facing the user while the second display device 110 may be at the bottom facing away from the user. In 602(2), the second display device 110 may be at the top facing the user and the first display device 108 may be at the bottom facing away from the user. In the tent orientation 602, the hinge angle 312 between the housings 102, 104 may be approximately between 0 and 180 degrees (e.g., 150 degrees, 120 degrees, 90 degrees, 60 degrees, 30 degrees, or the like).

In 604(1), the first display device 108 may be at the top facing the user and the second display device 110 may be at the bottom facing down. In some cases, the O/S may automatically turn off the microphone 134 (e.g., to stop receiving an audio signal from the microphone 134). In 604(2) the second display device 110 may be at the top facing the user and the first display device 108 may be at the bottom facing down. In some cases, the O/S may automatically turn off the microphone 132 (e.g., to stop receiving an audio signal from the microphone 132). In the presentation orientation 604, the angle between the housings 102, 104 may be approximately between 0 and 90 degrees (e.g., 90 degrees, 75 degrees, 60 degrees, 45 degrees, 30 degrees, 15 degrees, or the like).

In 606(1), the first display device 108 may be at the top facing the user and the second display device 110 may be at the bottom facing down (e.g., away from the user). In 606(2), the second display device 110 may be at the top facing the user and the first display device 108 may be at the bottom facing down (e.g., away from the user). In the horizontal tablet orientation 606, the hinge angle between the housings 102, 104 may be approximately 360 and the distance between the two microphones may be approximately zero.

In 608(1), the first display device 108 may be at the top facing the user and the second display device 110 may be at the bottom facing the user (e.g., in a position where traditionally, a keyboard is located in a laptop). In 608(1), in some cases, a QWERTY-based keyboard may be displayed on the second display device 110 and used to receive keyboard input. In 608(2), the second display device 110 may be at the top facing the user and the first display device 108 may be at the bottom facing the user (e.g., in a position where traditionally, a keyboard is located in a laptop). In 608(2), in some cases, a QWERTY-based keyboard may be displayed on the first display device 108 and used to receive keyboard input. In the clamshell orientation 608, the hinge angle 312 between the housings 102, 104 may be approximately between 0 and 90 degrees (e.g., 90 degrees, 75 degrees, 60 degrees, 45 degrees, 30 degrees, 15 degrees, or the like).

Figure 7:
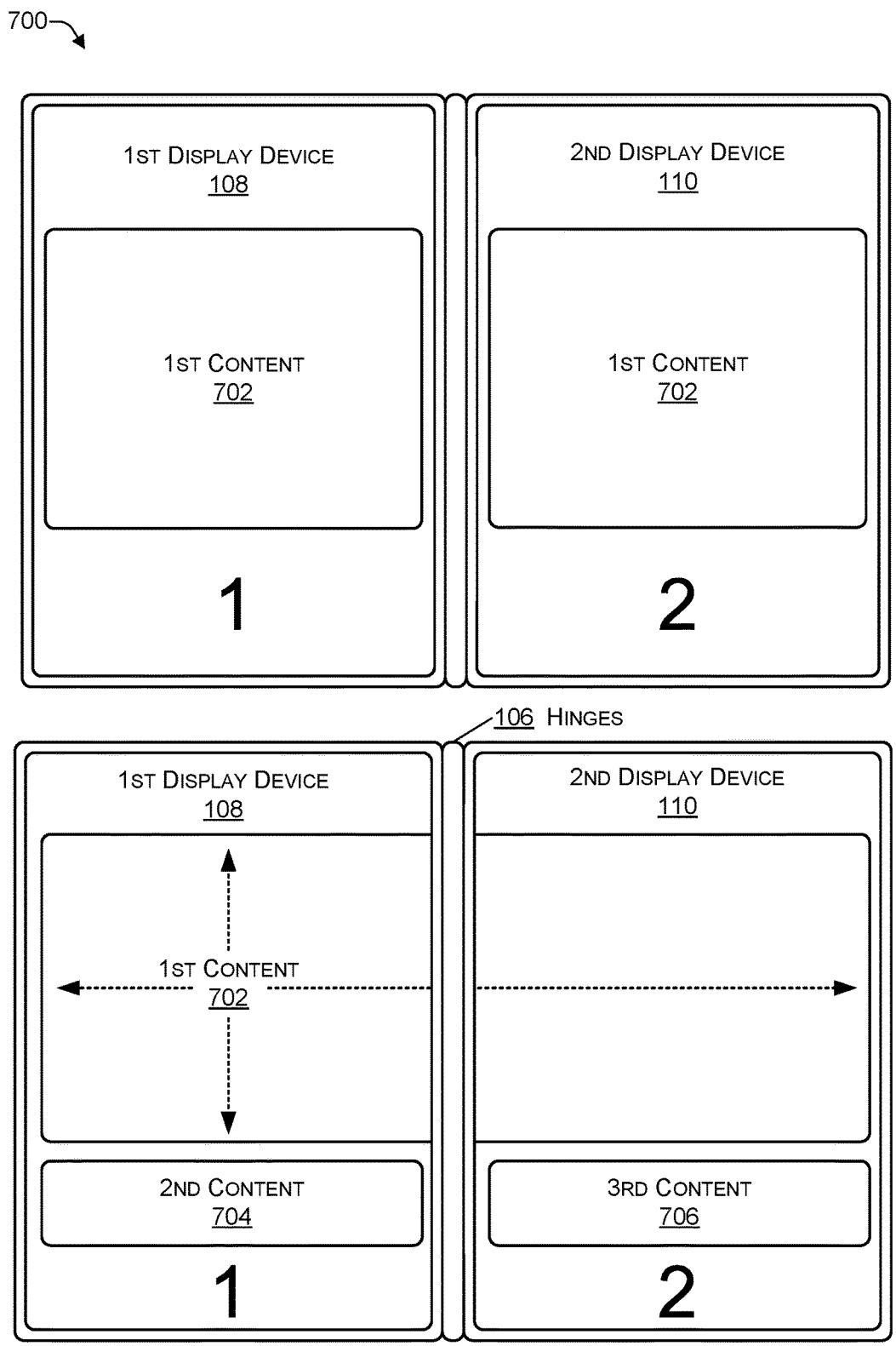
FIG. 7 is a block diagram illustrating different display modes of a dual-display device according to some embodiments.

FIG. 7 is a block diagram illustrating different display modes of a dual-display device (e.g., the computing device 100 of FIG. 1) according to some embodiments. The top half of FIG. 7 illustrates when a display mode of an operating system of the dual-display device is set to display content in a clone mode or in a single display mode. In the clone mode, first content 702 may be displayed both on the first display device 108 and on the second display device 110. In the single display mode, the first content 702 may be displayed on either (but not both) of the first display device 108 or the second display device 110.

The bottom half of FIG. 7 illustrates when a display mode of an operating system of the dual-display device is set to display content in an extended display mode, in which the second display device 110 is setup as an extension of the first display device 108. In the extended display mode, some content, such as the first content 702, may be displayed across both the first display device 108 and the second display device 110. In some cases, additional content may be displayed on either the first display device 108 or the second display device 110. For example, second content 704 may be displayed on the first display device 108 and third content 706 may be displayed on the second display device 110.

Figure 8:
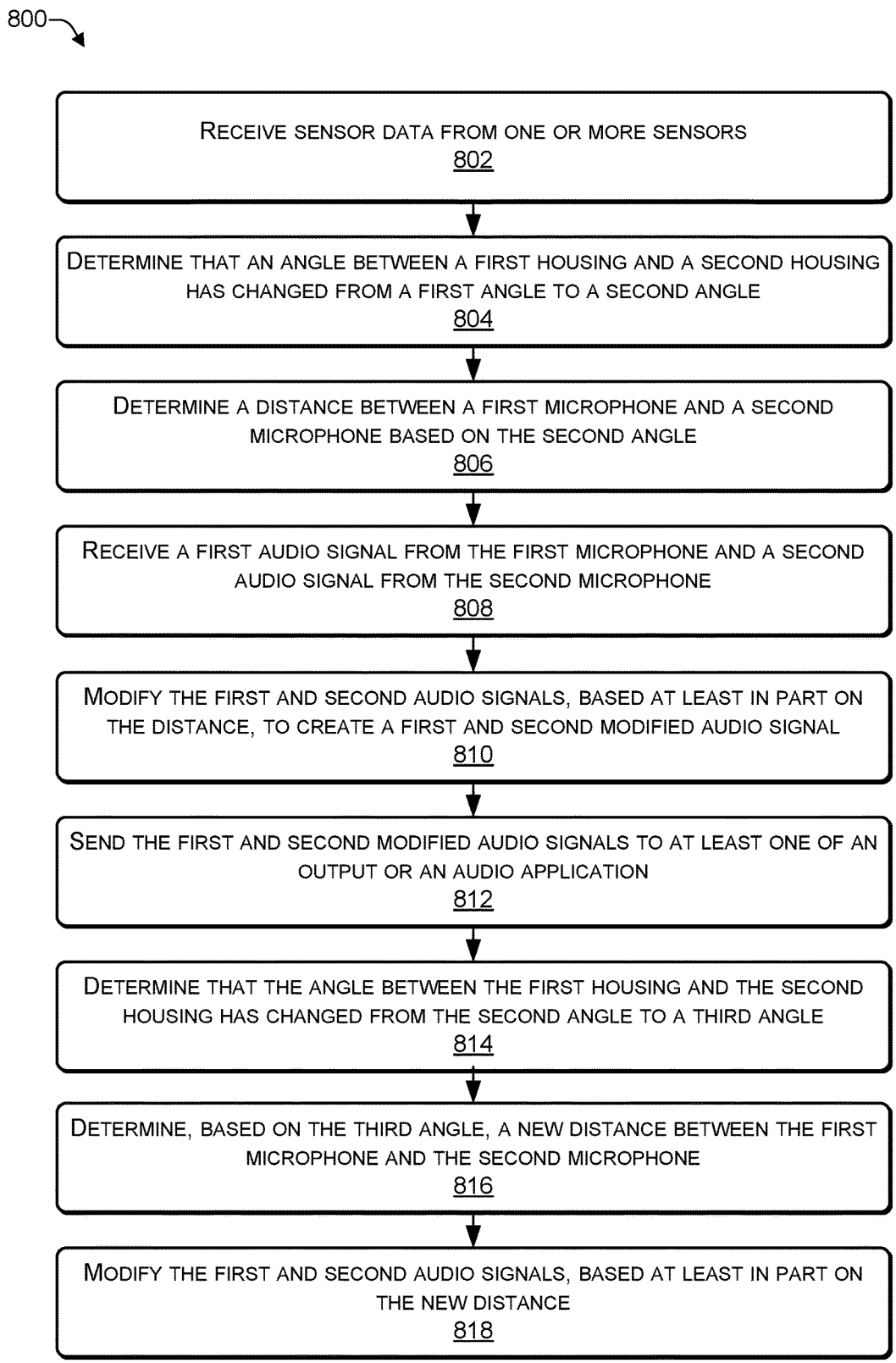
FIG. 8 is a flowchart of a process that includes determining that an angle between two housings of a computing device has changed according to some embodiments.
Figure 9:
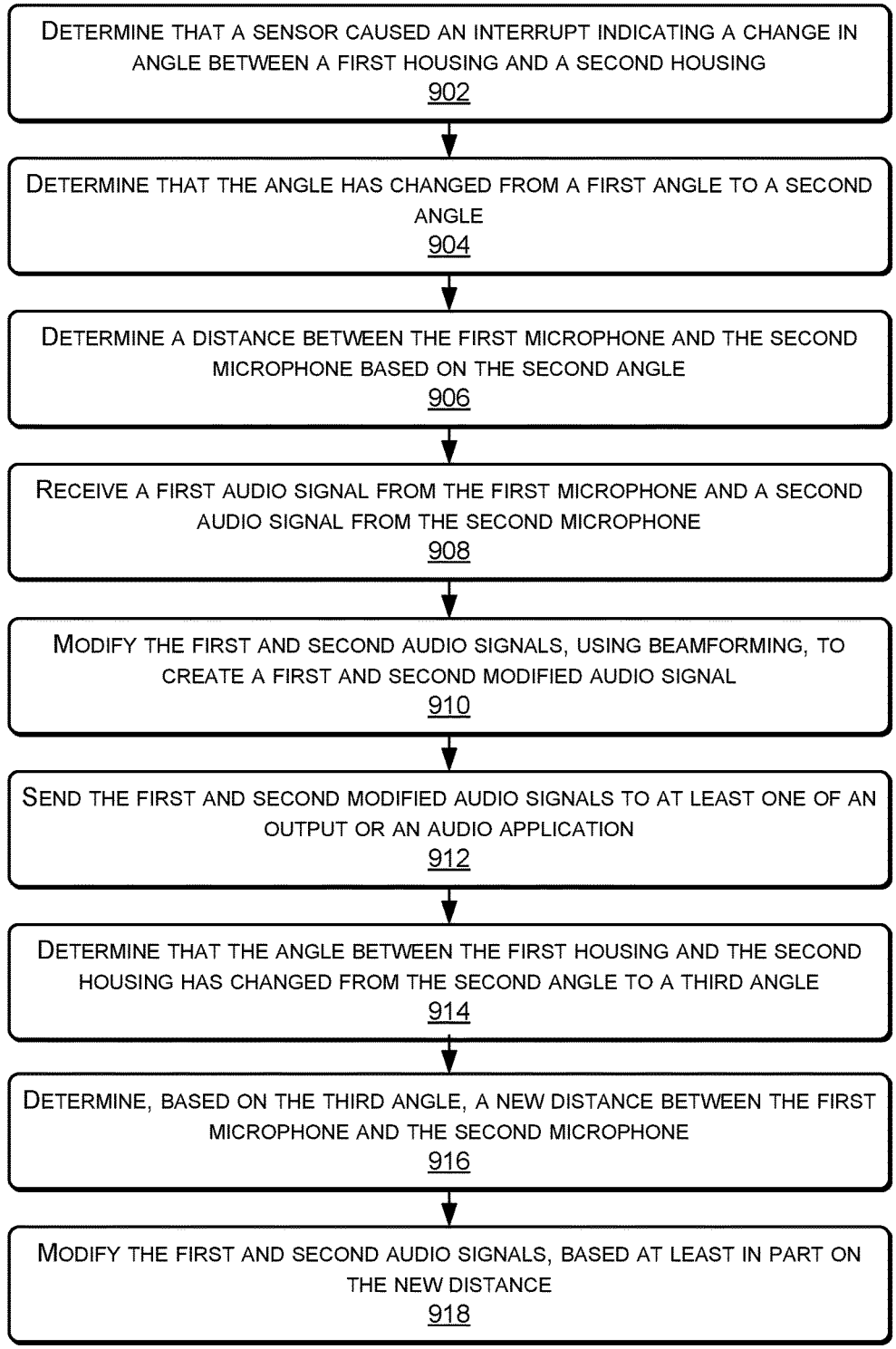
FIG. 9 is a flowchart of a process that includes modifying audio signals received from two (or more) microphones according to some embodiments.

In the flow diagrams of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to FIGS. 1, 2, 3, 4, 5, 6, and 7 as described above, although other models, frameworks, systems and environments may be used to implement this process.

FIG. 8 is a flowchart of a process 800 that includes determining that an angle between two housings of a computing device has changed according to some embodiments. For example, the process 800 may be performed by one or more components of the computing device 100 of FIG. 1. When a user powers on the computing device, logs in to the computing device, or starts an audio application, the computing device may determine an initial angle between a first housing and a second housing of a computing device. Based on the initial angle, a distance between a first microphone in the first housing and a second microphone in the second housing may be determined (e.g., using the law of cosines).

At 802, sensor data may be received from one or more sensors. At 806, based on the second angle, a distance between a first microphone in the first housing and a second microphone in the second housing may be determined. At 804, a determination may be made that an angle between a first housing and a second housing of a computing device has changed from a first angle (e.g., previous angle) to a second angle (e.g., current angle). At 806, based on the second angle, a distance between a first microphone in the first housing and a second microphone in the second housing may be determined. For example, in FIG. 3, the sensor data 302 may be received from one or more of the sensors 146, 152. The sensor data 302 may indicate that one or both of the housings 102, 104 was moved, thereby causing a change the hinge angle 312. The current hinge angle 312 may be determined (e.g., based on the sensor data 302) and a determination may be made as to whether the current hinge angle 312 differs from a previous hinge angle by more than a threshold amount (e.g., N millimeters (mm), N % or the like, where N>0). If the difference between the current hinge angle 312 and the previous hinge angle satisfies the threshold, then the current distance 206 between the microphones 132, 134 may be determined. For example, the current distance 206 may be determined using the law of cosines based on the current hinge angle 312.

At 808, a first audio signal may be received from the first microphone and a second audio signal may be received from a second microphone. At 810, the first audio signal may be modified to create a first modified audio signal and the second audio signal may be modified to create a second modified audio signal. At 812, the first modified audio signal and the second modified audio signal may be sent to at least one of an audio output or an audio application (e.g., a conferencing application, a speech-to-text application, or the like). For example, in FIG. 3, the audio codec 318 may receive the signals 156, 168 from the microphones 132, 134. The audio processing application 316 may modify the signals 156, 158 to create the modified signals 320. For example, beamforming (e.g., or other spatial filtering techniques) may be used on the signals 156, 158 to create the modified signals 320. The audio processing 316 may result in the modified signals 320 having a reduced noise component as compared to the signals 156, 158, thereby improving an intelligibility of speech in the signals 156, 158. In addition, the audio processing application 316 may perform echo cancellation, dynamic noise reduction, or other types of audio processing.

At 814, a determination may be made that the angle between the first housing and the second housing of the computing device has changed from the second angle to a third angle. At 816, a new distance between the first microphone and the second microphone may be determined based on the third angle. At 818, the first audio signal and the second audio signal may be modified based on the new distance. For example, in FIG. 3, additional sensor data may indicate that the angle between the two housings 102, 104 has changed again (from the second angle to a third angle), the third hinge angle may be determined, and a determination may be made as to whether the third hinge angle differs from the second hinge angle by more than a threshold amount. If the difference between the two hinge angles satisfies the threshold, then the current distance 206 between the microphones 132, 134 may be determined. For example, the current distance 206 may be determined using the law of cosines based on the current hinge angle 312.

Thus, each time the hinge angle between two housings of a computing device changes more than a threshold amount, the distance between the two microphones may be re-calculated. The re-calculated distance between the two microphones may be used by an audio processing application to process audio signals received from the microphones. In this way, changes in the hinge angle are taken into consideration when performing beamforming or other types of audio processing. For example, the audio signals may be processed to reduce a noise component (e.g., background noise) present in the audio signals and thereby increase the intelligibility of speech present in the audio signals.

FIG. 9 is a flowchart of a process 900 that includes modifying audio signals received from at least two microphones according to some embodiments. For example, the process 900 may be performed by one or more components of the computing device 100 of FIG. 1. When a user powers on the computing device, logs in to the computing device, or starts an audio application, the computing device may determine an initial angle between a first housing and a second housing of a computing device. Based on the initial angle, a distance between a first microphone in the first housing and a second microphone in the second housing may be determined (e.g., using the law of cosines).

At 902, a determination may be made that a sensor of a computing device caused an interrupt indicating that an angle between two housing of the computing device has changed. At 904, a determination may be made that an angle between a first housing and a second housing of a computing device has changed from a first angle (e.g., previous angle) to a second angle (e.g., current angle). At 906, based on the second angle, a distance between a first microphone in the first housing and a second microphone in the second housing may be determined. For example, in FIG. 3, in response to receiving an interrupt from at least one of the sensors 146, 152, the computing device 100 may determine the second angle 312 (e.g., based on the sensor data 302) and determine whether the second angle 312 differs from a first (e.g., previous) angle by more than a threshold amount. If the difference between the second angle 312 and the first angle satisfies the threshold, then the current distance 206 between the microphones 132, 134 may be determined. For example, the current distance 206 may be determined using the law of cosines, taking into account the second angle 312.

At 908, a first audio signal may be received from the first microphone and a second audio signal may be received from a second microphone. At 910, the first audio signal may be modified to create a first modified audio signal and the second audio signal may be modified to create a second modified audio signal. At 912, the first modified audio signal and the second modified audio signal may be sent to at least one of an audio output or an audio application (e.g., conferencing application, speech-to-text application, or the like). For example, in FIG. 3, the audio codec 318 may receive the signals 156, 168 from the microphones 132, 134. The audio processing application 316 may modify the signals 156, 158 to create the modified signals 320. For example, beamforming (or another spatial filtering technique) may be used on the signals 156, 158 to create the modified signals 320. The audio processing 316 may result in the modified signals 320 having a reduced noise component as compared to the signals 156, 158. For example, reducing noise present in the signals 156, 158 may improve an intelligibility of speech in the modified signals 320. In addition, the audio processing application 316 may perform echo cancellation, dynamic noise reduction, or other types of audio processing.

At 914, a determination may be made that the angle between the first housing and the second housing of the computing device has changed from the second angle to a third angle. At 916, a new distance between the first microphone and the second microphone may be determined (e.g., using the law of cosines) based on the third angle. At 918, the first audio signal and the second audio signal may be modified based on the new distance. For example, in FIG. 3, additional sensor data may indicate that the angle between the two housings 102, 104 has changed again (from the second angle to a third angle) and the third hinge angle may be determined and a determination may be made as to whether the third hinge angle differs from the second hinge angle by more than a threshold amount (e.g., N millimeters (mm) or N %, where N>0). If the difference between the third hinge angle and the second hinge angle satisfies the threshold, then a new distance (e.g., the current distance 206) between the microphones 132, 134 may be determined. For example, the current distance 206 may be determined using the law of cosines based on the current hinge angle 312.

Thus, one or more sensors may generate an interrupt when a hinge angle between two housings of a computing device have changed. The interrupt may cause the computing device to retrieve sensor data and determine a current hinge angle between two housings of a computing device. If the difference between the current hinge angle and a previous hinge angle satisfies a threshold, then the new distance between the two microphones may be determined (e.g., using the law of cosines). The new distance between the two microphones may be used to process audio signals received from the microphones. In this way, changes in the hinge angle may be taken into consideration by re-calculating the distance between the two microphones when performing beamforming or other spatial filtering. For example, the audio signals may be processed to reduce a noise component (e.g., background noise) present in the audio signals. Reducing the noise component may result in increased speech intelligibility.

Figure 10:
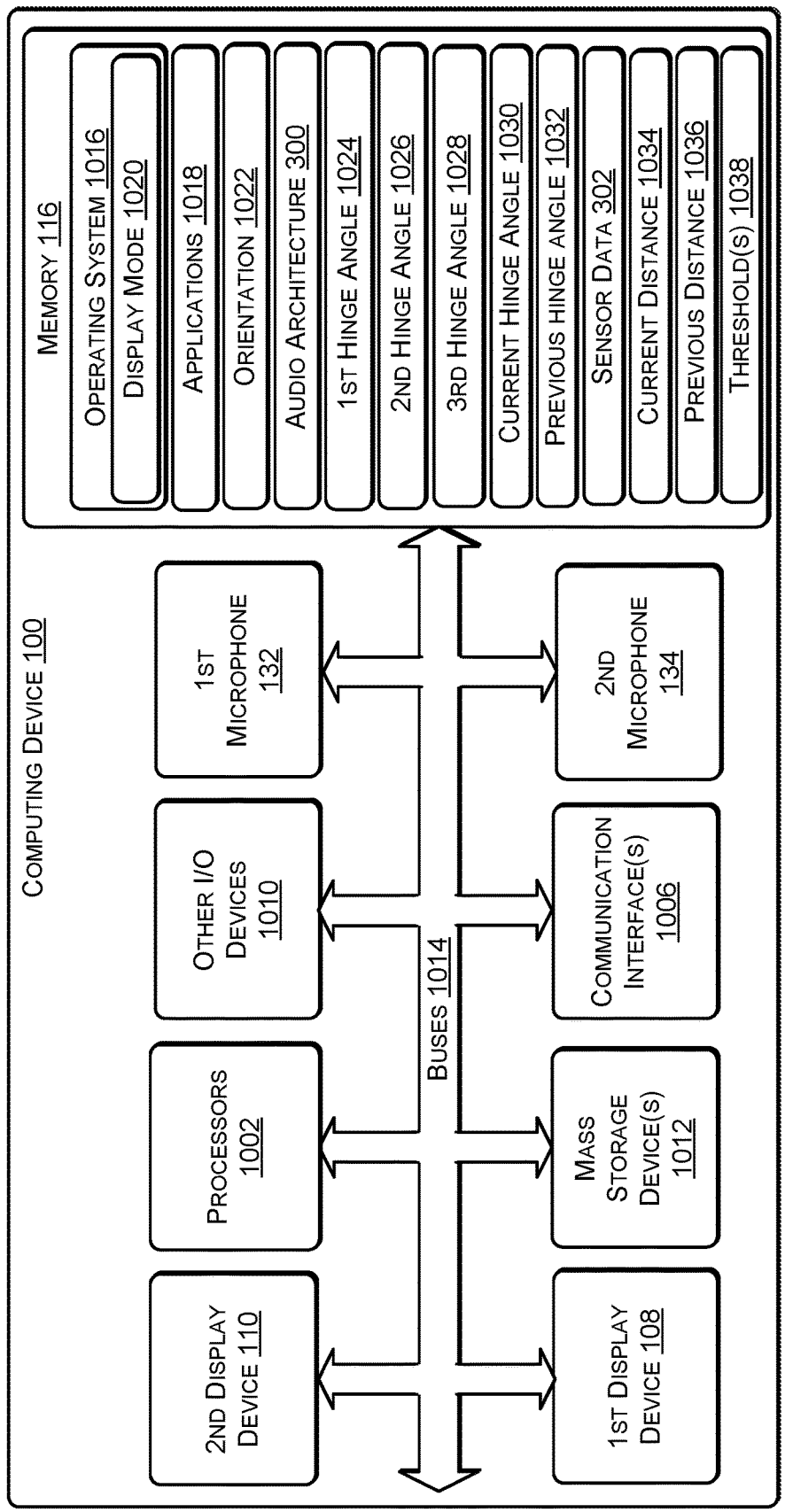
FIG. 10 illustrates an example configuration of a computing device that can be used to implement the systems and techniques described herein.

FIG. 10 illustrates an example configuration of the computing device 100 of FIG. 1 that can be used to implement the systems and techniques described herein. The computing device 100 may include one or more processors 1002 (e.g., one or more of the CPU 112, the GPU 114, and DSP 122 of FIG. 1), the memory 116, communication interfaces 1006 (e.g., the I/O ports 120), the display devices 108, 110, other input/output (I/O) devices 1010 (e.g., keyboard, trackball, and the like, such as the additional components 144), and one or more mass storage devices 1012, configured to communicate with each other, such as via one or more system buses 1014 or other suitable connection. While a single system bus is illustrated for ease of understanding, it should be understood that the system buses 1014 may include multiple buses, such as memory device buses, storage device buses, data buses, video signal buses, and the like.

The processors 1002 are one or more hardware devices that may include a single processing unit or a number of processing units, all of which may include single or multiple computing units or multiple cores. The processors 1002 may include the GPU 114 integrated into the CPU 112 or the GPU 114 may be a separate processor device from the CPU 112. The DSP 122 may also be integrated into the CPU 112 or may be a separate device from the CPU 112. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 116, mass storage devices 1012, or other computer-readable media.

Memory 116 and mass storage devices 1012 are examples of non-transitory computer media (e.g., memory storage devices) for storing instructions that can be executed by the processors 1002 to perform the various functions described herein. For example, memory 116 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 116 and mass storage devices 1012 may be collectively referred to as memory or computer storage media herein, and may be any type of non-transitory media capable of storing computer-readable, processor-executable program instructions as computer program code that can be executed by the processor 1002 as a particular machine configured for carrying out the operations and functions described in the implementations herein.

The computing device 100 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 1006 can also provide communication with external storage (not shown), such as in a storage array, network attached storage, storage area network, or the like. The display devices 108, 110 may be located in the housings 102, 104, respectively, that are connected using one or more hinges (e.g., the hinges 106 of FIG. 1) that enable each display device to be placed at an angle relative to the other display device. For example, the display devices 108, 110 may be used for displaying information and images to users. Other I/O devices 1010 may be devices that receive various inputs from a user and provide various outputs to the user, and may include a keyboard, a remote controller, a mouse, a printer, audio input/output devices, and so forth.

The computer storage media, such as memory 116 and mass storage devices 1012, may be used to store software and data. For example, the computer storage media may be used to store an operating system 1016 of the computing device 100 and software applications 1018. The operating system 1016 may be set to a particular display mode 1020. For example, the operating system 1016 may have a default display mode and a user may set the display mode 1020 to something different than the default display mode. The display mode 1020 may be one of (1) an extended display mode (e.g., see bottom of FIG. 7), (2) a single display mode (e.g., see top of FIG. 7), or (3) a clone mode (e.g., see top of FIG. 7). The computer storage media may store an orientation 1022 (e.g., one of the orientations illustrated in FIGS. 4, 5, and 6), and one or more software applications 1028. The software applications 1028 may display the content 702, 704, 706 of FIG. 7 and may include a word processing application, a spreadsheet application, a conferencing application, a speech-to-text application, and the like. The memory 116 may be used to store the audio architecture 300 of FIG. 3, and various hinge angles between the housings 102, 104, such as a first hinge angle 1024, a second hinge angle 1026, a third hinge angle 1028, a current hinge angle 1030, and a previous hinge angle 1032. The sensor data 302 may be used to determine one or more of the hinge angles 1024, 1026, 1028, 1030, or 1032. One or more of the hinge angles 1024, 1026, 1028, 1030, or 1032 may be used to determine a current distance 1034 between the microphones 132, 134 and may have been used to determine a previous distance 1036 between the microphones 132, 134. For example, if the current hinge angle 1030 differs from the previous hinge angle 1032 by more than a threshold 1038 amount, the current distance 1034 between the microphones 132, 134 may be determined. If the second hinge angle 1026 differs from the first hinge angle 1024 by more than a threshold 1038 amount, the current distance 1034 between the microphones 132, 134 may be determined. If the third hinge angle 1028 differs from the second hinge angle 1026 by more than the threshold 1038 amount, the current distance 1034 between the microphones 132, 134 may be determined.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising a first microphone;
   a second housing comprising a second microphone;
   one or more hinges that couple the first housing to the second housing;
   one or more processors; and
   one or more non-transitory computer-readable media to store instructions executable by the one or more processors to perform operations comprising:
      determining that an angle between the first housing and the second housing has changed from a first angle to a second angle;
      determining, based on the second angle, a distance between the first microphone and the second microphone;
      receiving a first audio signal from the first microphone;
      receiving a second audio signal from the second microphone;
      modifying the first audio signal, based at least in part on the distance, to create a first modified audio signal by modifying at least one of (i) a first lower frequency band that includes frequencies lower than a first voice frequency band or (ii) a first higher frequency band that includes frequencies higher than the first voice frequency band, wherein the first audio signal includes the first lower frequency band, the first voice frequency band, and the first higher frequency band;
      modifying the second audio signal, based at least in part on the distance, to create a second modified audio signal by modifying at least one of (i) a second lower frequency band that includes frequencies lower than a second voice frequency band or (ii) a second higher frequency band that includes frequencies higher than the second voice frequency band, wherein the second audio signal includes the second lower frequency band, the second voice frequency band, and the second higher frequency band; and
      sending the first modified audio signal and the second modified audio signal to at least one of an output jack or an audio application.

2. The computing device of claim 1, wherein the first modified audio signal includes less noise compared to the first audio signal.

3. The computing device of claim 1, wherein at least one of the first higher frequency band or the first lower frequency band of the first modified audio signal has at least a phase or a volume that is different from the first audio signal.

4. The computing device of claim 1, wherein an audio processing application performs spatial filtering using the first audio signal and the second audio signal as inputs to create the first modified audio signal and the second modified audio signal.

5. The computing device of claim 1, further comprising:
   determining that the angle between the first housing and the second housing has changed from the second angle to a third angle;
   determining, based on the third angle, a new distance between the first microphone and the second microphone;
   modifying the first audio signal, based at least in part on the new distance; and
   modifying the second audio signal, based at least in part on the new distance.

6. The computing device of claim 1, further comprising:
   receiving sensor data from one or more sensors; and
   determining a second hinge angle between the first housing and the second housing based at least in part on the sensor data.

7. The computing device of claim 1, wherein determining, based on the second angle, the distance between the first microphone and the second microphone comprises:
   retrieving a first offset distance between the first microphone and the one or more hinges;
   retrieving a second offset distance between the second microphone and the one or more hinges; and
   determining the distance between the first microphone and the second microphone based on:
      the first offset distance;
      the second offset distance; and
      the second angle.

8. A method comprising:
   determining, by a computing device comprising a first housing connected to a second housing by one or more hinges, that an angle between the first housing and the second housing has changed from a first angle to a second angle;

determining, based on the second angle, a distance between a first microphone located in the first housing and a second microphone located in the second housing;

receiving, by audio processing software being executed by the computing device, a first audio signal from the first microphone and a second audio signal from the second microphone;

modifying, by the audio processing software, the first audio signal, based at least in part on the distance, to create a first modified audio signal by modifying at least one of a first lower frequency band that includes lower frequencies than a first voice frequency band or a first higher frequency band that includes higher frequencies than the first voice frequency band;

modifying, by the audio processing software, the second audio signal, based at least in part on the distance, to create a second modified audio signal by modifying at least one of a second lower frequency band that includes lower frequencies than a second voice frequency band or a second higher frequency band that includes higher frequencies than the second voice frequency band; and sending the first modified audio signal and the second modified audio signal to at least one of an output jack or an audio application.

9. The method of claim 8, wherein the second angle is between about 20 degrees to about 160 degrees.

10. The method of claim 8, further comprising:
determining that the angle between the first housing and the second housing has changed from the second angle to a third angle;
determining, based on the third angle, a new distance between the first microphone and the second microphone; and
reducing an amount of noise in the first audio signal and the second audio signal by using a beamforming algorithm based on the new distance.

11. The method of claim 8, further comprising:
receiving sensor data from one or more sensors included in the computing device; and
determining a second hinge angle based at least in part on the sensor data.

12. The method of claim 8, further comprising:
determining that a sensor included in the computing device caused an interrupt;
retrieving sensor data from the sensor; and
determining a second hinge angle based at least in part on the sensor data.

13. The method of claim 11, wherein-determining, based on the second angle, the distance between the first microphone located in the first housing and the second microphone located in the second housing comprises:
retrieving a first offset distance of the first microphone from the one or more hinges;
retrieving a second offset distance of the second microphone from the one or more hinges; and
determining the distance between the first microphone and the second microphone based at least in part on:
the first offset distance,
the second offset distance and,
the second angle.

14. One or more non-transitory computer-readable media to store instructions executable by one or more processors to perform operations comprising:
determining that an angle between a first housing and a second housing has changed from a first angle to a second angle, wherein the first housing is connected to the second housing by one or more hinges;
determining, based on the second angle, a distance between a first microphone in the first housing and a second microphone in the second housing;
receiving a first audio signal from the first microphone;
receiving a second audio signal from the second microphone;
modifying the first audio signal, based at least in part on the distance, to create a first modified audio signal by modifying at least one of a first lower frequency band that includes lower frequencies than a first voice frequency band or a first higher frequency band that includes higher frequencies than the first voice frequency band;
modifying the second audio signal, based at least in part on the distance, to create a second modified audio signal by modifying at least one of a second lower frequency band that includes lower frequencies than a second voice frequency band or a second higher frequency band that includes higher frequencies than the second voice frequency band; and
sending the first modified audio signal and the second modified audio signal to at least one of an output jack or an audio application.

15. The one or more non-transitory computer-readable media of claim 14, wherein the second angle is between about 20 degrees to about 160 degrees.

16. The one or more non-transitory computer-readable media of claim 14, further comprising:
determining that the angle between the first housing and the second housing has changed from the second angle to a third angle;
determining, based on the third angle, a new distance between the first microphone and the second microphone; and
modifying the first audio signal and the second audio signal, based at least in part on the new distance to reduce an amount of noise present in the first audio signal and the second audio signal.

17. The one or more non-transitory computer-readable media of claim 16, wherein the first modified audio signal and the second modified audio signal increase an intelligibility of speech as compared to the first audio signal and the second audio signal.

18. The one or more non-transitory computer-readable media of claim 14, further comprising:
receiving sensor data from one or more sensors; and
determining the second angle based at least in part on the sensor data.

19. The one or more non-transitory computer-readable media of claim 14 further comprising:
determining that a sensor caused an interrupt;
retrieving sensor data from the sensor; and
determining the second angle based at least in part on the sensor data.

20. The one or more non-transitory computer-readable media of claim 14 wherein determining, based on the second angle, the distance between the first microphone located in the first housing and the second microphone located in the second housing comprises:
retrieving a first offset distance between the first microphone and the one or more hinges;
retrieving a second offset distance between the second microphone and the one or more hinges; and
determining the distance based on:
the first offset distance;

the second offset distance; and
the second angle.

\* \* \* \* \*